United States Patent [19]
Ashburn

[11] Patent Number: 5,657,436
[45] Date of Patent: Aug. 12, 1997

[54] PREPROCESSING APPARATUS AND METHOD FOR LINE SCAN CONVERSION IN A COMPUTER GRAPHICS SYSTEM

[75] Inventor: Jon L. Ashburn, Fort Collins, Colo.

[73] Assignee: Hewlett-Packard Company, Palo Alto, Calif.

[21] Appl. No.: 488,473

[22] Filed: Jun. 8, 1995

[51] Int. Cl.$^6$ ............................................. G06F 15/00
[52] U.S. Cl. ............................................. 395/141
[58] Field of Search ........................... 395/143, 141, 395/142, 140; 345/118

[56] References Cited

U.S. PATENT DOCUMENTS

| | | | |
|---|---|---|---|
| 5,115,402 | 5/1992 | Matsushiro et al. | 395/141 |
| 5,117,485 | 5/1992 | Malachosky et al. | 395/134 |
| 5,142,617 | 8/1992 | Dalrymple et al. | 395/132 |
| 5,353,394 | 10/1994 | Kubota | 395/141 |
| 5,371,843 | 12/1994 | Pomichter, Jr. | 395/141 |
| 5,471,568 | 11/1995 | Webb et al. | 395/133 |
| 5,528,737 | 6/1996 | Sfarti | 395/141 |

*Primary Examiner*—Phu K. Nguyen

[57] ABSTRACT

Inputs to a line scan stepper of a line scan converter are generated for a line segment so that the inputs are rendered in a predetermined rendering direction. The predetermined rendering direction includes an implied orientation for line segments that have an implied orientation, such as single line segments and line segments that are part of a polyline. The predetermined rendering direction also includes a consistent direction for polygon edge line segments. For adjacent line segments of a polyline, vertices are swapped in a virtual manner so that a vertex that is shared between the adjacent line segments need be provided only once to the line scan converter.

19 Claims, 12 Drawing Sheets

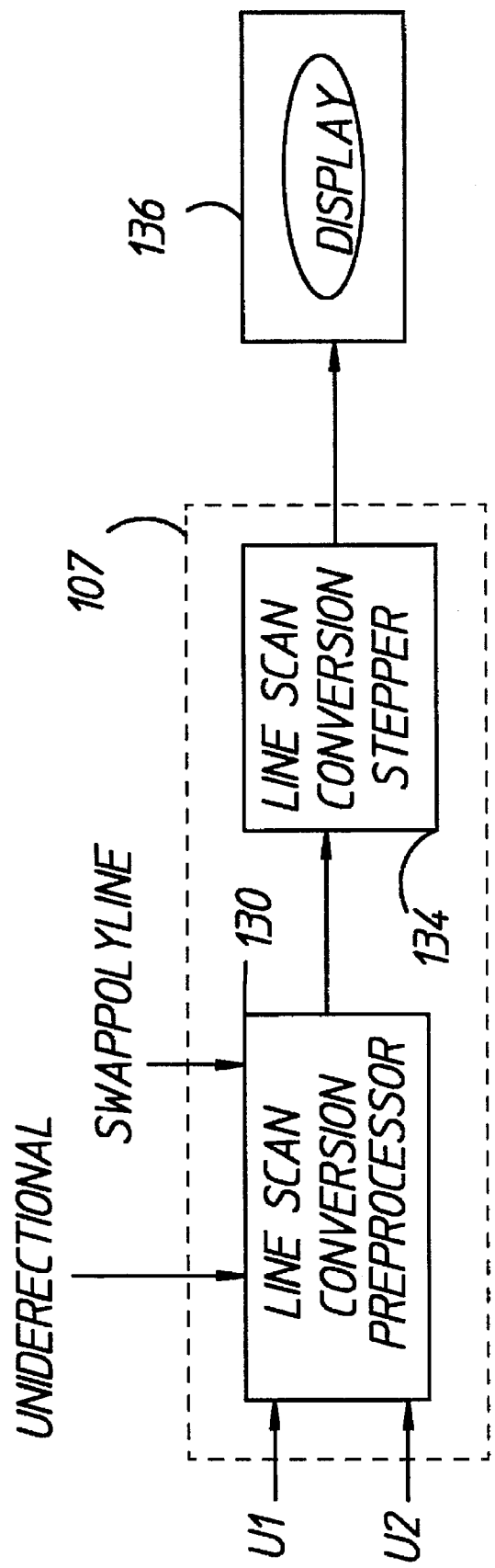

PREPROCESSING APPARATUS AND METHOD FOR LINE SCAN CONVERSION IN A COMPUTER GRAPHICS SYSTEM

FIELD OF THE INVENTION

This invention relates generally to display graphics generation, and more particularly to preprocessing data associated with line segments for input into a line scan conversion stepper.

BACKGROUND OF THE INVENTION

In order to display objects on a video display screen, graphics primitives, such as lines, triangles and quadrilaterals, are typically converted into a pixel representation. This is because a display screen is configured with rows and columns of pixels that are individually activated to represent an object. In many cases, such as diagonal line segments between two vertices, for example, a line segment being displayed may not exactly intersect the center locations of pixels. In order to display this type of line segment, also known as a vector, different techniques are used to determine which pixels to activate. The general term for selecting pixels to activate is called rasterizing. One such process is called DDA (Digital Differential Analyzer) scan conversion. Another technique, which is a variation of DDA, is called Bresenham's line algorithm. Each of these techniques may be generally referred to as a line scan conversion process, and may be implemented by what is known as a line scan converter. The line scan converter converts geometrical data representative of a graphics line primitive into pixel data representative of the primitive.

In both of these techniques, the pixels selected for activation are dependent upon the direction used to "render" a line segment. As used herein, the direction in which a line segment is "rendered" actually refers to the order in which pixel data for the line segment is calculated. For example, the pixels selected for a line segment rendered from vertex V1 to vertex V2 may be different than the pixels selected for a line segment rendered from vertex V2 to V1. When several connected line segments make up a polygon edge, for example to render an edge of a triangle or quadrilateral, the line segments may be rendered in different directions. Therefore, if two adjacent polygons each contain a shared edge that is rendered in different directions for each of the two polygons, the adjacent sides may not precisely coincide.

Often, a line segment may have an implied orientation. An example is a dashed line made up of alternating dashes and spaces. The dashed line may begin with a dash at one vertex if rendered in one direction, yet may begin with a space at that vertex if rendered in the other direction. Typically, each line segment of a series of connected line segments that make up a polyline has an implied orientation. Otherwise, the pixels at a point where two of the line segments join may be rendered twice. A drawback of known line scan converters is that they may render line segments with the same implied orientation in different directions.

When applying a line scan conversion to a series of connected line segments that make up a polyline, it may be necessary to provide the line scan converter with the same vertex data twice. For example, a first line segment of a polyline may have vertices V1 and V2 as endpoints, and a second line segment of the polyline may have vertices V2 and V3 as endpoints. In prior art graphics systems, the vertex V2 data would be provided twice to the line scan converter. However, the process of providing the vertex data twice requires additional processing and memory, and is therefore undesirable.

SUMMARY OF THE INVENTION

According to the present invention, an apparatus for line scan conversion of vertex data in a computer graphics system is provided. The vertex data is representative of a line segment. The apparatus comprises a line scan preprocessor and a line scan stepper. The line scan preprocessor generates rendering parameters in a predetermined rendering direction in response to the vertex data. The line scan preprocessor includes a first circuit responsive to an input indicative of a line segment type for determining whether the vertex data for first and second vertices corresponds to the predetermined rendering direction and a second circuit responsive to a determination that the vertex data does not correspond to the predetermined rendering direction for swapping an order of calculation of the rendering parameters to achieve the predetermined rendering direction. The line scan convertor converts the rendering parameters to pixel data for generating a display of the line segment. Preferably, the first circuit includes means for providing the determination that the vertex data does not correspond to the predetermined rendering direction when the line segment type indicates that the line segment is an even segment of a polyline. The line scan preprocessor may further include a third circuit for determining whether the line segment has a major step direction of a predetermined sign, and the first circuit may include means for providing the determination that the vertex data does not correspond to the predetermined rendering direction when the line segment type indicates that the line segment is an edge of a polygon, and the third circuit determines that the line segment has a major step direction of the predtermined sign. The line scan preprocessor may further include a memory for storing the vertex data for the first and second vertices at first and second locations, respectively, and a control circuit for providing first and second addresses of the first and second locations to access the vertex data for generating said rendering parameters, and the first circuit may include a multiplexer for swapping the first and second addresses in response to the determination that the vertex data does not correspond to the predetermined rendering direction.

Another aspect of the invention is directed to a method for preprocessing vertex data for a first vertex and a second vertex of a line segment to generate rendering parameters, the method comprising the steps of determining whether the vertex data for the first and second vertices corresponds to a predetermined rendering direction in response to an indication of line segment type, swapping an order of calculation of the rendering parameters to achieve the predetermined rendering direction when the vertex data does not correspond to the predetermined rendering direction, and calculating the rendering parameters for the line segment in the predetermined rendering direction. In one embodiment, the method includes steps of storing the vertex data for the first and second vertices in a memory at first and second locations respectively, providing first and second addresses of the first and second locations to access the vertex data for generating the rendering parameters, and providing a multiplexer for swapping the first and second addresses in response to the determination that the vertex data does not correspond to the predetermined rendering direction. The method may also include steps of receiving vertex data for a third vertex representative of a second line segment, the first line segment and the second line segment being adjacent segments of a polyline, and generating the rendering parameters for the line scan stepper based upon the data for the second vertex and the data for the third vertex, so that the line scan stepper renders the second line segment in a direction from the second vertex to the third vertex.

Another aspect of the invention is directed to an apparatus for preprocessing vertex data for a first vertex and a second vertex of a line segment to generate rendering parameters, the apparatus comprising means for determining whether the vertex data for the first and second vertices corresponds to a predetermined rendering direction in response to an indication of line segment type, means for swapping an order of calculation of the rendering parameters to achieve the predetermined rendering direction when the vertex data does not correspond to the predetermined rendering direction, and means for calculating the rendering parameters for the line segment in the predetermined rendering direction. In one embodiment, the apparatus includes means for storing the vertex data for the first and second vertices in a memory at first and second locations respectively, means for providing first and second addresses of the first and second locations to access the vertex data for generating the rendering parameters, and a multiplexer for swapping the first and second addresses in response to the determination that the vertex data does not correspond to the predetermined rendering direction. The apparatus may also include means for receiving vertex data for a third vertex representative of a second line segment, the first line segment and the second line segment being adjacent segments of a polyline, and means for generating the rendering parameters for the line scan stepper based upon the data for the second vertex and the data for the third vertex, so that the line scan stepper renders the second line segment in a direction from the second vertex to the third vertex.

BRIEF DESCRIPTION OF THE DRAWINGS

Other features and advantages of the present invention shall appear from the following description of an exemplary embodiment, said description being made with reference to the appended drawings, of which:

FIG. 3 shows a line scan converter in accordance with one embodiment of the invention;

DETAILED DESCRIPTION

Figure 1:
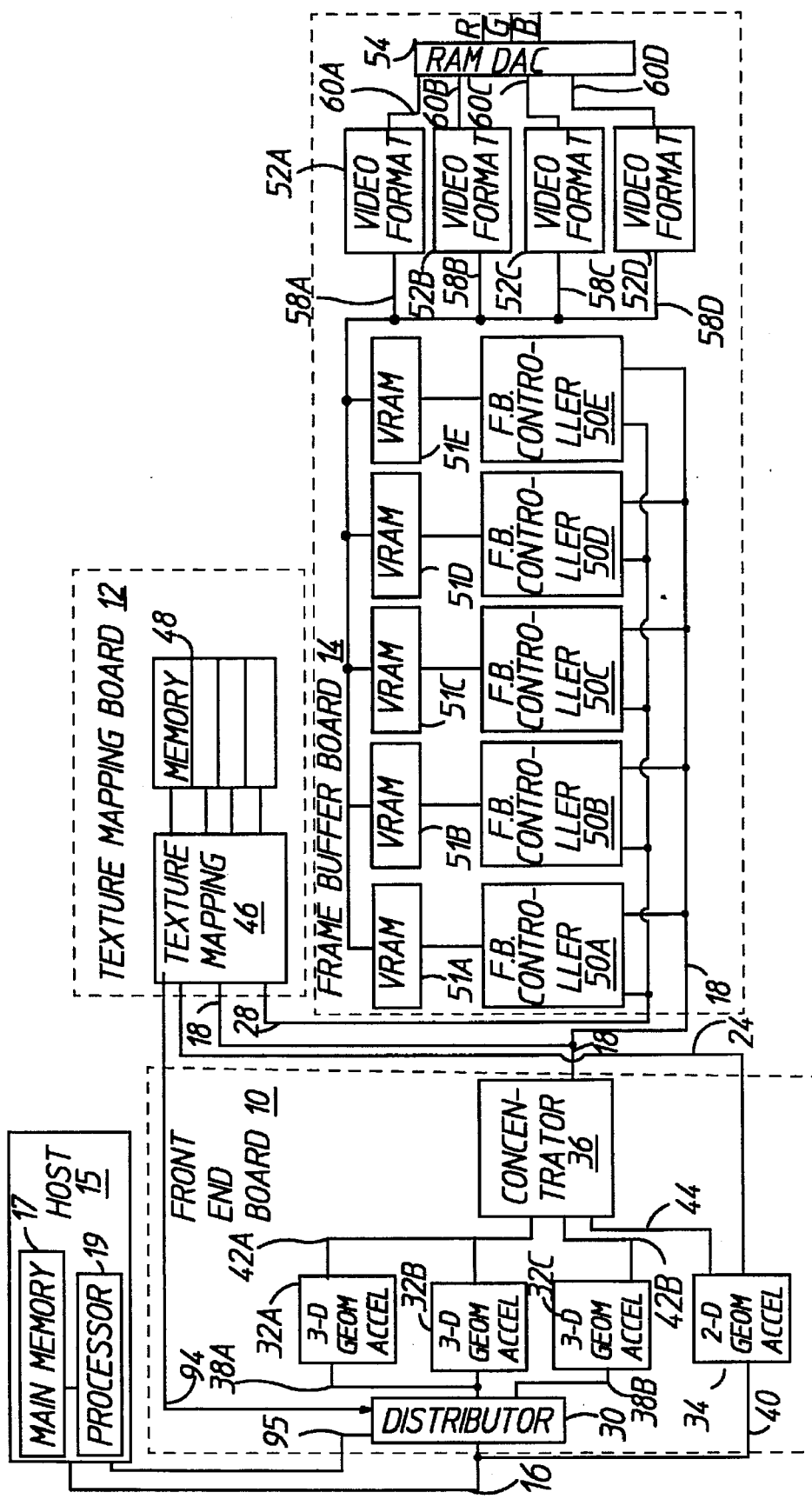
FIG. 1 is block diagram of a second embodiment of a computer graphics system incorporating the present invention.

FIG. 1 is a block diagram of one embodiment of a graphics system suitable for incorporation of line scan conversion preprocessing in accordance with the present invention. It should be understood that the illustrative implementation shown is merely exemplary with respect to the number of boards and chips, the manner in which they are partitioned, the bus widths, and the data transfer rates. Numerous other implementations can be employed. The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Veralog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by x,y,z vector coordinate data, R,G,B color data and texture S,T coordinates, all for portions of the primitives, such as for the vertices when the primitive is a triangle. Data representing the primitives in three dimensions then is provided by the front end board 10 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data is provided to the frame buffer board over five 55-bit buses 28, which are shown in FIG. 1 as a single bus to clarify the figure.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 includes a distributor chip 30, three three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the x,y,z coordinates that define the primitives received into corresponding screen space coordinates, determines object R,G,B values and texture S,T values for the screen space coordinates, decomposes primitive quadrilaterals into triangles, computes a triangle plane equation to define each triangle, and computes light source calculations to determine R,G,B values. Each 3-D geometry accelerator chip also performs view clipping operations to ensure an accurate screen display of the resulting image when multiple windows are displayed, or when a portion of a primitive extends beyond the view volume represented on the display screen. Output data from the 3-D geometry accelerator chips 32A and 32B, and 32C respectively is provided over 44-bit buses 42A and 42B to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. As described in greater detail below, the cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include points, lines and triangles. The texture mapping board does not perform texture mapping of points or lines, and operates only upon triangle primitives. The data representing the triangle primitives includes the x,y,z object pixel coordinates for at least one vertex, the object color R,G,B values for the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

In one exemplary embodiment, the cache stores sixty-four blocks of 256×256 texels. Unlike the local memory employed in the texture mapping hardware of prior art systems, the cache memory of the present invention may not store the entire series of MIP maps of the texture that maps to the primitive being rendered, such as for large textures. Rather, the cache memory stores at any one time only the particular portions of the series of MIP maps actually used in currently rendering the primitive. Therefore, for most applications, only a portion of the complete texture data for the image being rendered will be stored in the cache memory at any one time.

The complete series of MIP maps for each texture is arranged and stored in the main memory 17 of the host computer 15. For each pixel of the primitive being rendered, the texture mapping chip 46 accesses a directory of the cache memory 48 to determine whether the corresponding texel or texels of the texture MIP maps are currently present in the cache. If the corresponding texels are stored in the cache memory at the time of the access, a cache hit occurs, and the texels are read from the cache and operated upon by the texture mapping chip 46 to compute the resultant texture data which is passed to the frame buffer board.

However, if the corresponding texels for the primitive pixel are not stored in the cache memory when accessed by the texture mapping chip 46, a cache miss occurs. When a cache miss occurs, the portion of the texture MIP map data needed to render the primitive is downloaded from the main memory 17 of the host computer 15 into the cache memory 48, possibly replacing some data previously stored therein. However, unlike conventional texture mapping systems that download the entire series of MIP maps for any primitive being rendered, the present invention downloads only the portion of the series of MIP maps actually needed to currently render the primitive or the currently rendered portion thereof. As is explained in greater detail below, when a cache miss occurs, an interrupt control signal is generated by the texture mapping chip 46 to initiate a texture interrupt manager in the host computer 15. The interrupt control signal is provided over line 94 to the distributor chip 30, which in turn provides an interrupt signal over line 95 to the host computer.

The requested texture data is retrieved by the host computer from its main memory and is downloaded to the texture mapping board 48 over bus 24, bypassing the 3-D primitive rendering pipeline through the front end board and the texture mapping chip. Thus, when a cache miss interrupt occurs, the front end board can continue to operate upon 3-D primitives and provide output primitive data over bus 18 to the texture mapping chip and the frame buffer board, while the texture data associated with a primitive that caused the cache miss is being downloaded from main memory 17. In contrast to conventional texture mapping systems, the downloading of texture data to the texture mapping hardware does not require a flushing of the 3-D primitive pipeline, thereby increasing the bandwidth and performance of the system. The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A–E are respectively coupled to groups of associated VRAM (video random access memory) chips 51A–E. The frame buffer board further includes four video format chips, 52A, 52B, 52C and 52D, and a RAMDAC (random access memory digital-toanalog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen.

The manner in which the object and texture color values are combined can be controlled in a number of different ways. For example, in a replace mode, the object color values can be simply replaced by the texture color values, so that only the texture color values are used in rendering the pixel. Alternatively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel.

The resulting image video data generated by the flame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 33 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 1A:
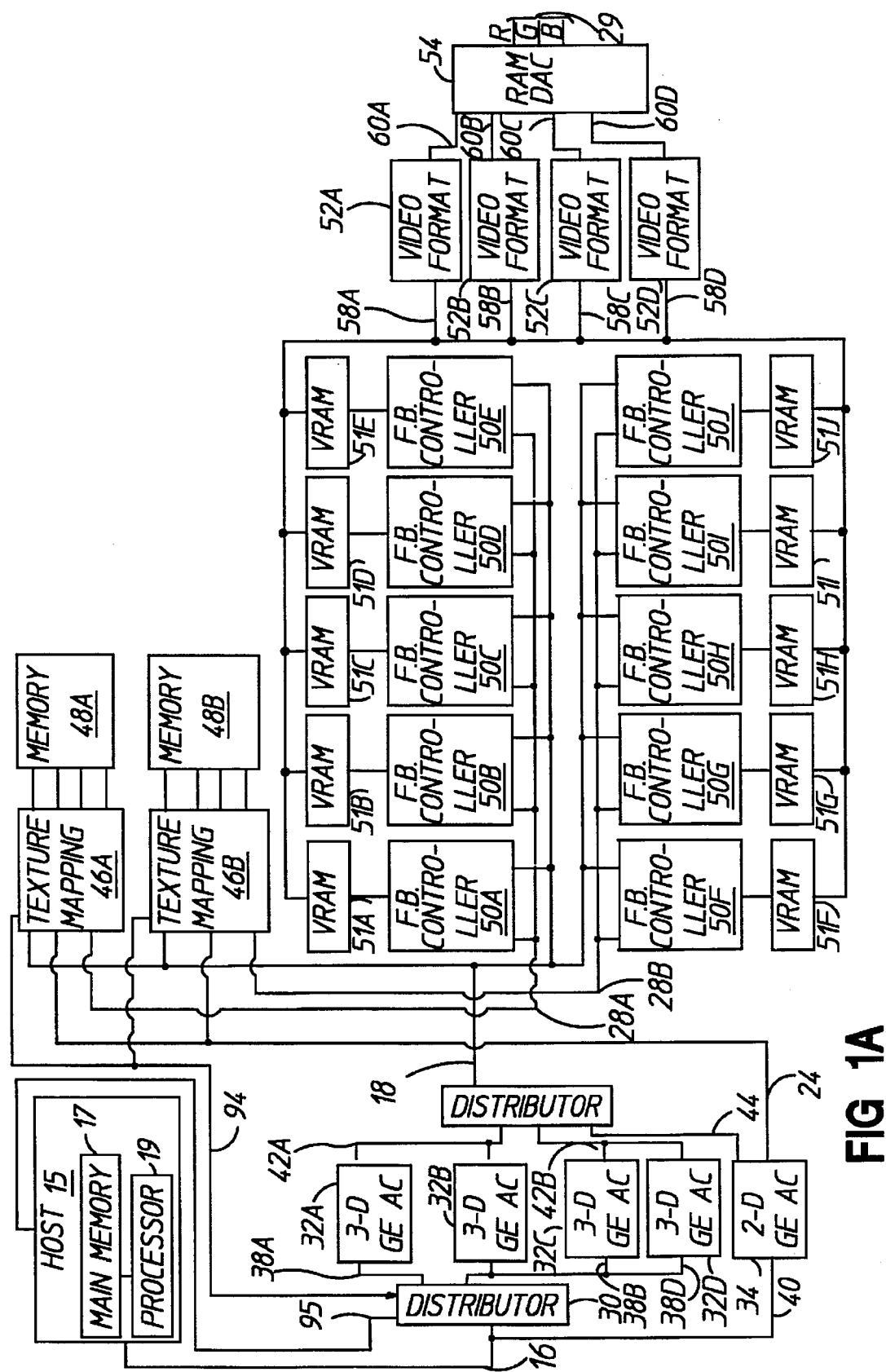
FIG. 1A of a second embodiment of a computer graphics system incorporating the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 1A, which is a block diagram of a computer graphics system of the present invention having certain hardware replicated. The system of FIG. 1A includes four 3-D geometry accelerator chips 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 1A is similar to that of the system of FIG. 1, described above. The replication of the hardware in the embodiment of FIG. 1A allows for increased system bandwidth because certain primitive rendering operations can be performed in parallel on multiple primitives.

Figure 2:
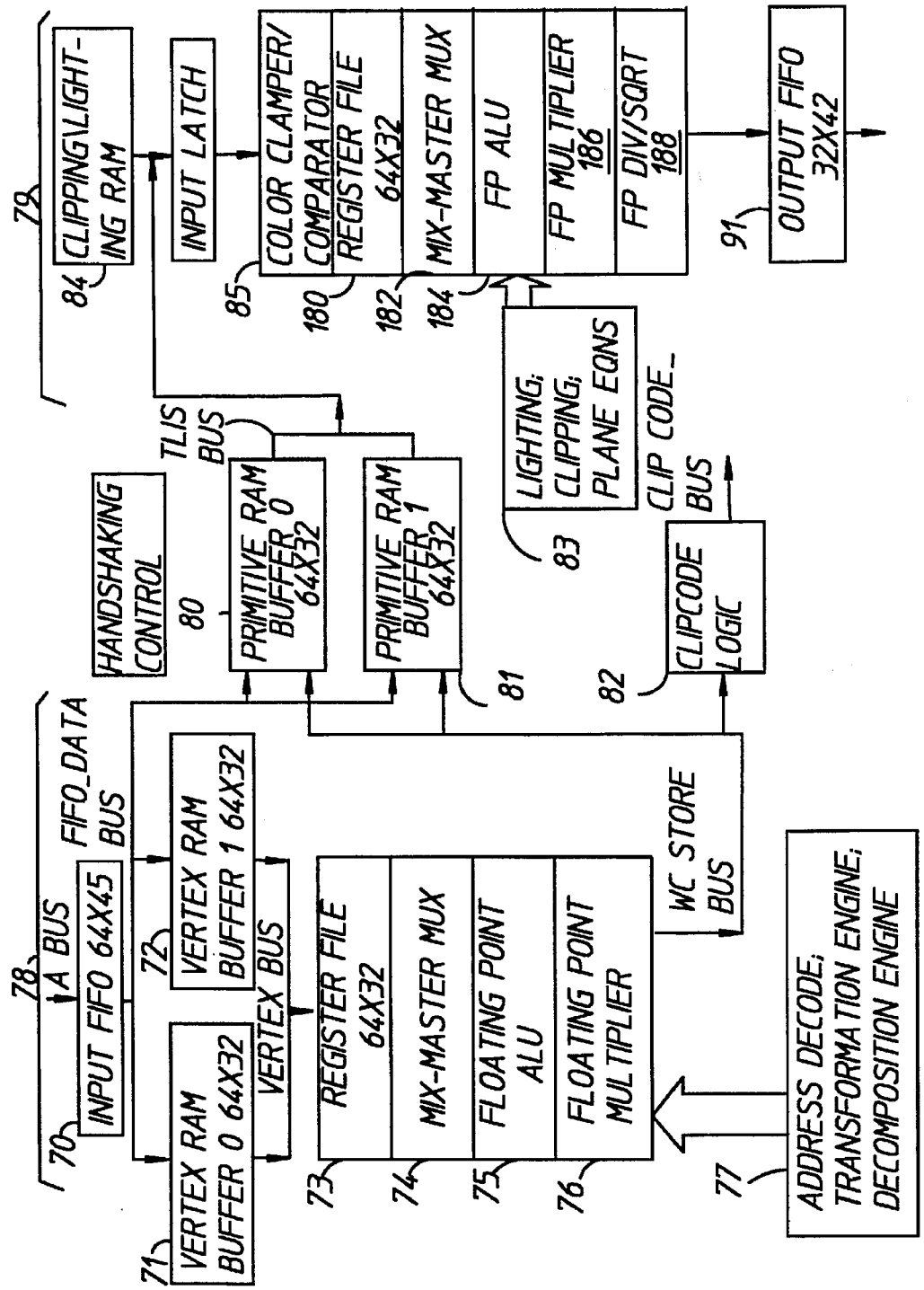
FIG. 2 is block diagram of a geometry accelerator incorporating an embodiment of the present invention.

A simplified block diagram representative of geometry accelerator chips 32A, 32B and 32C is shown in FIG. 2. Primitive data from host computer 15 is supplied through an input FIFO 70 to a double-buffered vertex RAM which includes vertex RAM (buffer 0) 71 and vertex RAM (buffer 1) 72 The geometry accelerator includes two separate processors in a pipeline configuration. A left stack 78 includes clip code logic 82, a register file 73, a multiplexer 74, a floating point ALU 75 and a floating point multiplier 76. Operations of the left stack 78 are controlled by a left stack control unit 77, which includes address decode logic, a transformation engine and a decomposition engine. Results from the left stack 78 are supplied to a right stack 79 through a double-buffered primitive RAM, including a primitive RAM (buffer 0) 80 and a primitive RAM (buffer 1) 81. The right stack includes a color clamper/comparator 85, a register file 180, a multiplexer 182, a floating point ALU 184, a floating point multiplier 186, and a floating point divide/square root unit 188. Results from the right stack 79 are supplied through an output FIFO 91 to the texture mapping board 12 and the frame buffer board 14 (FIG. 1). Operations of the right stack 79 are controlled by a right stack control unit 83. The right stack performs lighting, clipping, and plane equation calculations. Clipping and lighting parameters are supplied by the host computer 15 to a clipping/lighting RAM 84.

The geometry accelerator performs transformations, decomposition of quadrilaterals, partial slope calculations for triangles and vectors, lighting (or shading), clipping, and plane equation (or slope) calculations of randomly oriented and defined quadrilaterals (quads), triangles and vectors. The outputs are supplied to the scan converters in the frame buffer board 14 for rendering into pixel data and to texture mapping board 12 for generation of per pixel texture color values.

In the example of FIG. 2, only the right stack 79 contains a divider, in order to limit size and cost. Because the right stack contains a divider and the left stack does not, the partitioning of functionality of the geometry accelerator is for the left stack to perform transformations, partial slope calculations, clip checking, decomposition and some pre-calculations for lighting. The right stack performs lighting, clipping and plane equation calculations. The basic flow of operations is for primitive data to be entered in the input FIFO 70 from the host computer. The primitive data is put into one of the vertex RAM buffers 71 and 72 The left stack 78 then performs transformations, decomposition, and partial slope calculations and places the results in one of the primitive RAM buffers 80 and 81 When the left stack has completed its operations for a primitive, it notifies the right stack 78 to begin operations on the primitive. The left stack can then start working on the next primitive. At the same time, the right stack performs lighting, clipping (if required), and plane equation calculations on the primitive that is in the primitive RAM buffer.

In an alternative embodiment, both the left and right stacks contain identical hardware, including dividers. In this configuration, functionality may be partitioned such that each stack performs the same operations on different primitives.

Referring to FIG. 3, a line scan converter 107 according to an illustrative embodiment of the invention includes a line scan conversion preprocessor 130 and a line scan conversion stepper 134. With respect to the system shown in FIG. 1, in a preferred embodiment the line scan conversion preprocessor 130 resides within each of the 3-D geometry accelerator chips 32 A–C. The line scan conversion stepper 134 resides within each of the frame buffer controller chips 50 A–E. The line scan conversion preprocessor 130 receives vertex data for vertices V1, V2, and a unidirectional signal and a swappolyline signal, described below. Typically, these inputs may be received either directly or indirectly from host computer 15 of FIG. 1, for example in the form of a primitive type designation of an object and other data associated with the object. The data may be received directly from the host computer 15, or may be processed by upstream circuitry within the geometry accelerator, that performs such functions as transformations and partial slope calculations on vertex data received from the host computer 15.

The unidirectional signal, when active, indicates that vertices V1 and V2 represent vertices of a line segment that is an edge of a polygon. With respect to polygon segments, this disclosure pertains to the rendering of polygon edges. Other techniques, known as fill techniques, may be used to render the area within the edges of a polygon. The swappolyline signal, when active, is indicative of a line segment that is to have its vertices swapped, for example as in every other line segment of a group of line segments that make up a polyline. The concepts of unidirectional line segments and swapping vertices are described in more detail below. Line scan conversion preprocessor 130 provides the stepper inputs to line scan conversion stepper 134, which generates the appropriate pixel information for display 136.

Within line scan conversion preprocessor 130, the stepper inputs to the stepper 134 are generated, including: major axis; major step direct; major start; major stop; slope; minor start. These inputs to stepper 134 are explained below.

Additionally, if a line segment to be rendered is three dimensional or has color attributes, the appropriate inputs for these additional parameters are also generated. These additional parameters may include: red, green, and blue start values; red, green and blue slope values; Z-axis start; and Z-axis slope. These inputs to stepper 134 are explained below.

Figure 4A:
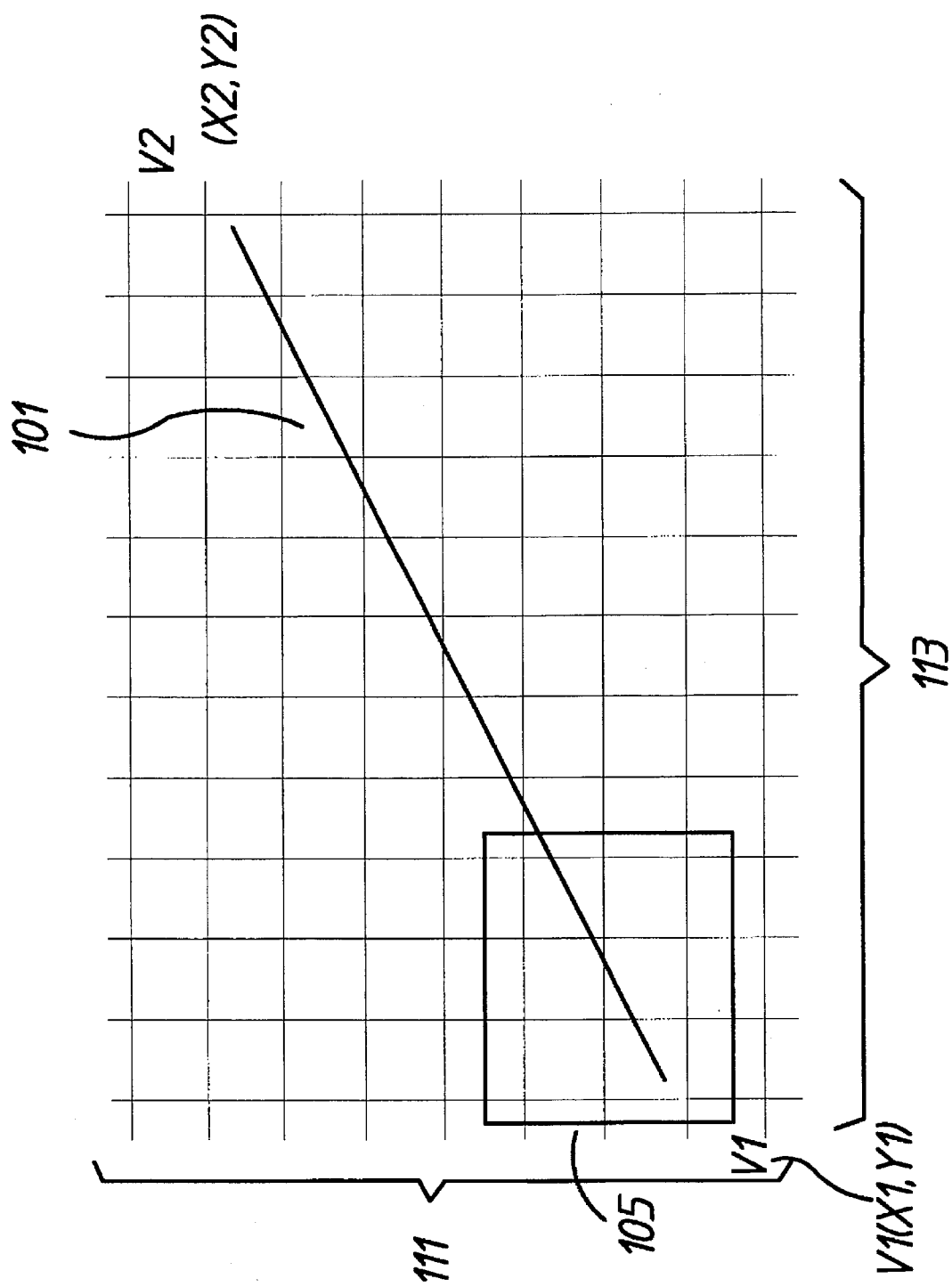
FIG. 4a is a diagram showing a line segment on a grid in which each intersection of the grid lines represents a pixel position, at integer values of x and y.

Referring to FIG. 4a, a line segment 101 has a first vertex V1 and a second vertex V2. Typically, each of these vertices has X and Y coordinates, for example V1=(X1, Y1), and V2=(X2, Y2). In some instances, the line segment may represent a three-dimensional line, in which case the data for the first and second vertices includes Z-axis coordinates, respectively designated Z1 and Z2. The Z-axis coordinates are used in calculations to simulate three-dimensional imagery on a two-dimensional (x,y) display. Additionally, the line segment may have a color which varies from vertex V1 to vertex V2, so that the data for the first and second vertices also includes red, green, and blue values, respectively designated R1, G1, B1, and R2, G2, B2. The line segment may be a line with an implied orientation, such as a dashed line. The line segment may also be part of a polyline, which can be used to render curved lines. A series of four X,Y vertices, for example, defines a polyline with three line segments. The line segment may also be an edge of a polygon.

Figure 4B:
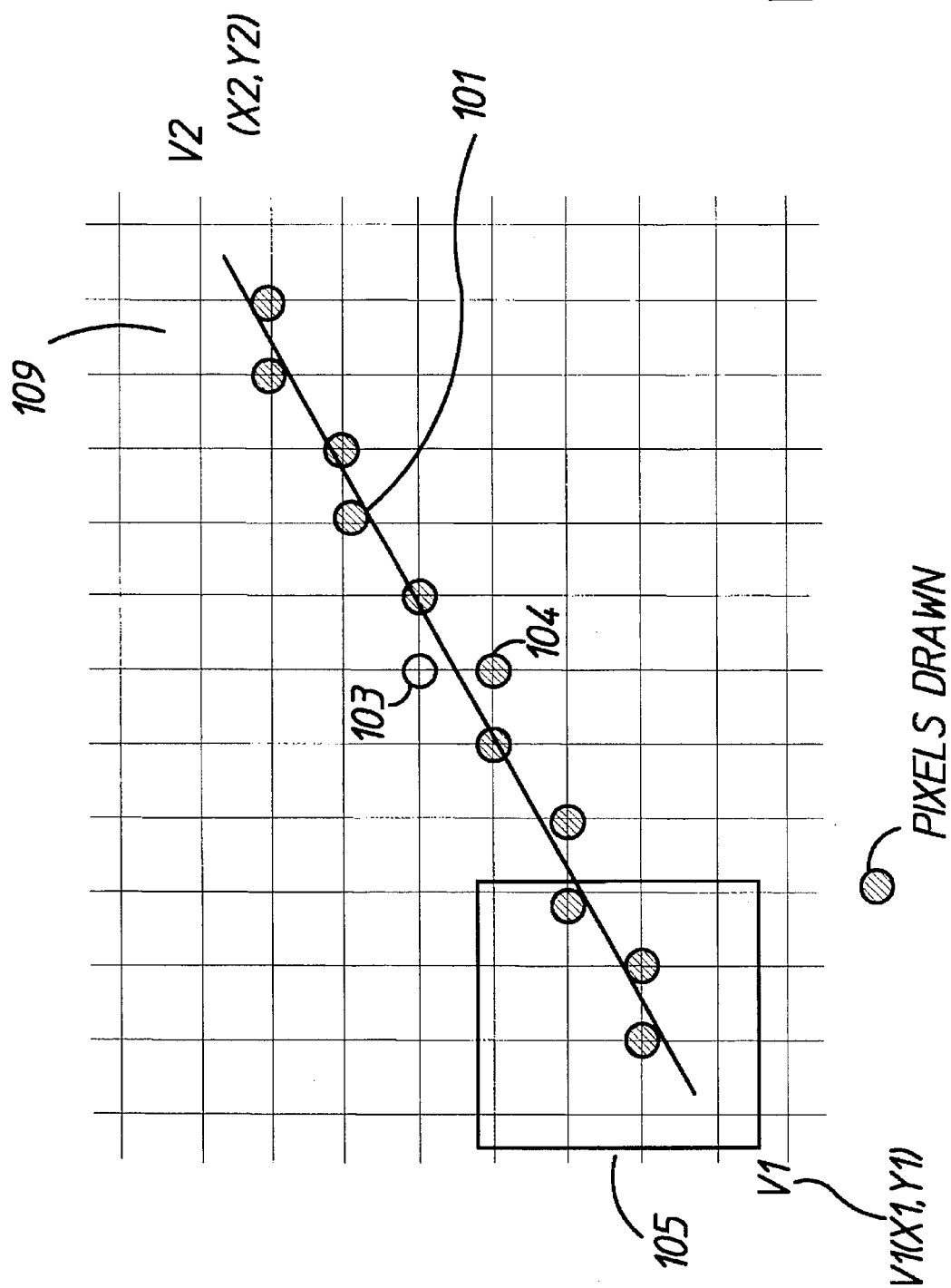
FIG. 4b is a diagram which shows the pixels illuminated by the system of FIG. 3, for the line segment of FIG. 4a, as well as one of the pixels which might be illuminated if the line segment were rendered in the opposite direction.

Referring to FIGS. 4a and 4b, the line segment 101 does not always coincide exactly with each of the pixels, which are located at the intersections between the horizontal grid lines 111 and the vertical grid lines 113. For the purpose of this disclosure, values along the x-axis increase from left to right, while values along the y-axis increase from top to bottom, although these designations are not necessary for this invention. The line scan converter 107 illuminates a series of pixels 109 at positions adjacent to the line segment. The line scan converter can use the DDA technique or the Bresenham technique to select the pixels to be displayed.

This may be advantageous because then the stepper 134 only needs to perform additions, and may be implemented in relatively simple electronic hardware, while the preprocessor 130 performs multiplication and may be implemented in hardware, software, or a combination of hardware and software.

Figure 5:
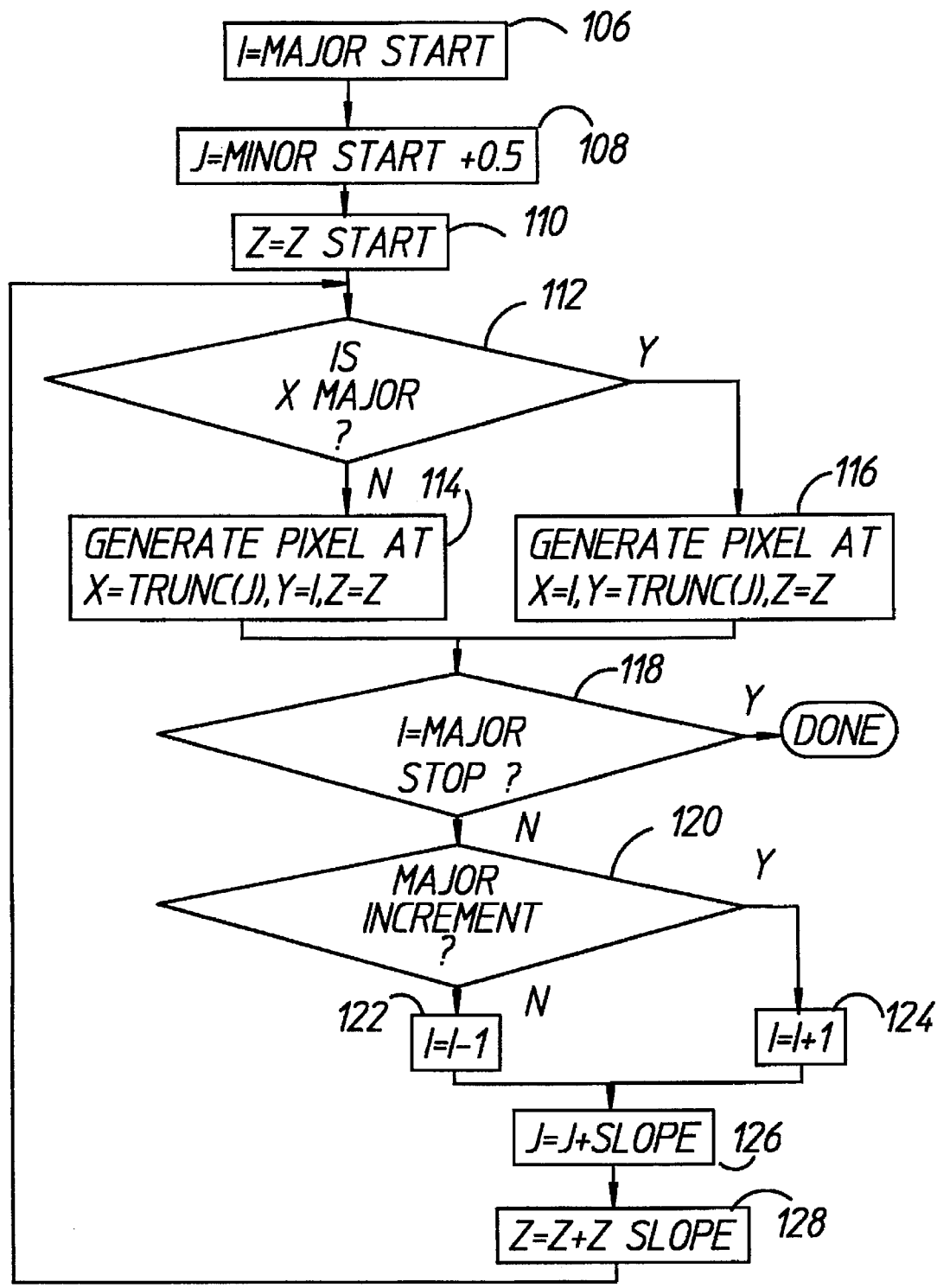
FIG. 5 is a flowchart illustrating the operation of the stepper of the line scan converter of FIG. 3.

Referring to FIGS. 3 and 5, the inputs to the stepper 134 include a major axis signal which indicates the direction, either X or Y, for which the line segment has a larger difference between vertices V1 and V2. A major step direction signal indicates whether the major axis is increasing or decreasing from the first vertex to the second vertex of the line segment. A major start signal represents the coordinate value of the major axis sub-pixel adjusted from the first vertex of the line segment (for example the X-coordinate value at location "A" on FIG. 6), while a major stop value represents the coordinate value of the major axis sub-pixel adjusted from the second vertex of the line segment. A minor start signal represents the value of the minor axis sub-pixel adjusted from the first vertex, and the slope represents the amount of coordinate change in the minor axis with respect to the amount of coordinate change in the major axis along the line segment. FIG. 5 also shows the example in which a third parameter, the Z-coordinate, is included.

In general, the stepper 134 of the line scan converter 107 searches for the most appropriate pixel, or the "closest" pixel, by rounding the minor axis value to the nearest integer. The stepper 134 may be generalized to handle either X major or Y major axis line segments, and to allow stepping along the major axis in either direction, referred to as either a major increment or a major decrement. This allows the major axis value to be generated by an up-down counter in hardware, and also allows the minor axis value to be generated by always adding a positive slope. Complex rounding is avoided by adding 0.5 to the minor axis value, and then truncating the result after the appropriate slope has been added. Accordingly, complex hardware is avoided in the stepper 134. The direction in which the stepper 130 steps in along the major axis is determined by the manner in which the vertices are provided from the preprocessor 130 to the stepper 134. In this disclosure, the term "rendering" with respect to a particular direction refers to providing the vertex data to the stepper 130 so that the stepper 130 steps in the particular direction.

Referring to FIG. 5, detailed operation of the line scan conversion stepper 134 will be described. Operation begins with the initialization of a variable I, typically used only within the stepper 134, to be equal to the major start signal (step 106). A variable J, also used within the stepper 134, is initialized to be equal to minor start +0.5 (step 108), and a variable Z is initialized to be equal to Z start (step 110) Step 112 determines whether X is the major axis. If X is the major axis, then a pixel is generated at the pixel location having the coordinates X=I, Y=J truncated, and Z=Z (step 116). If X is not the major axis, then it follows that Y is the major axis. Accordingly, a pixel is generated at the pixel location having the coordinate X=J truncated, Y=I, and Z=Z (step 114).

Next, the stepper 134 determines whether I is equal to the major stop, i.e., whether the second vertex of the line segment 101 has been reached (step 118). If it has, the process is completed. If not, the stepper 134 examines the major step direction to determine whether the major axis is incremented. If it is, then I is incremented by 1 (step 124). If the major axis is not to be incremented, then I is decremented by 1 (step 122). J is then incremented by an amount equal to the slope (step 126). Note that if the display 136 is to represent a 3-dimensional object, then Z is now incremented by Z slope (step 128). The process then returns to the next step of determining whether X is the major axis (step 112) and generates additional pixels (steps 114 or 116), depending upon the major axis, until the major stop is reached (step 118). It may be noted that the major axis remains fixed for a particular segment, and therefore step 112 is normally only performed once and thereafter the process performs the appropriate pixel generation (step 114 or step 116).

It is possible that the line segment 101 may have different pixels illuminated depending upon the direction in which the pixel data is calculated. For example, if the pixels to be activated for line segment 101 were determined by rendering line segment 101 from vertex V2 to vertex V1, as shown in FIG. 4b, instead of from vertex V1 to vertex V2, it is possible that the pixel 103 would have been illuminated instead of the pixel 104 below it. This is due to the fact that if the minor axis value of the line segment is equidistant between two minor axis integer values, then when rendered in one direction the minor axis value would be rounded up (to pixel 103), while when rendered in the other direction the minor axis value would be rounded down (to pixel 104). Additionally, accumulated error due to precision limitations may also affect the rendered pixels. For example, if a line scan stepper is limited to 12 bits in a fractional part of an X-coordinate value (the integer part may also have a number of bits), error from this precision limitation will accumulate as the stepper steps, thus affecting the rendered pixels even if the value of the actual line is not exactly midpoint between two integer values. As described above, this may result in different pixels being activated for each of two different ways to render one line segment. This is of particular concern in line segments with implied orientations such as individual line segments and polyline line segments, as well as polygon line segments.

Figure 6:
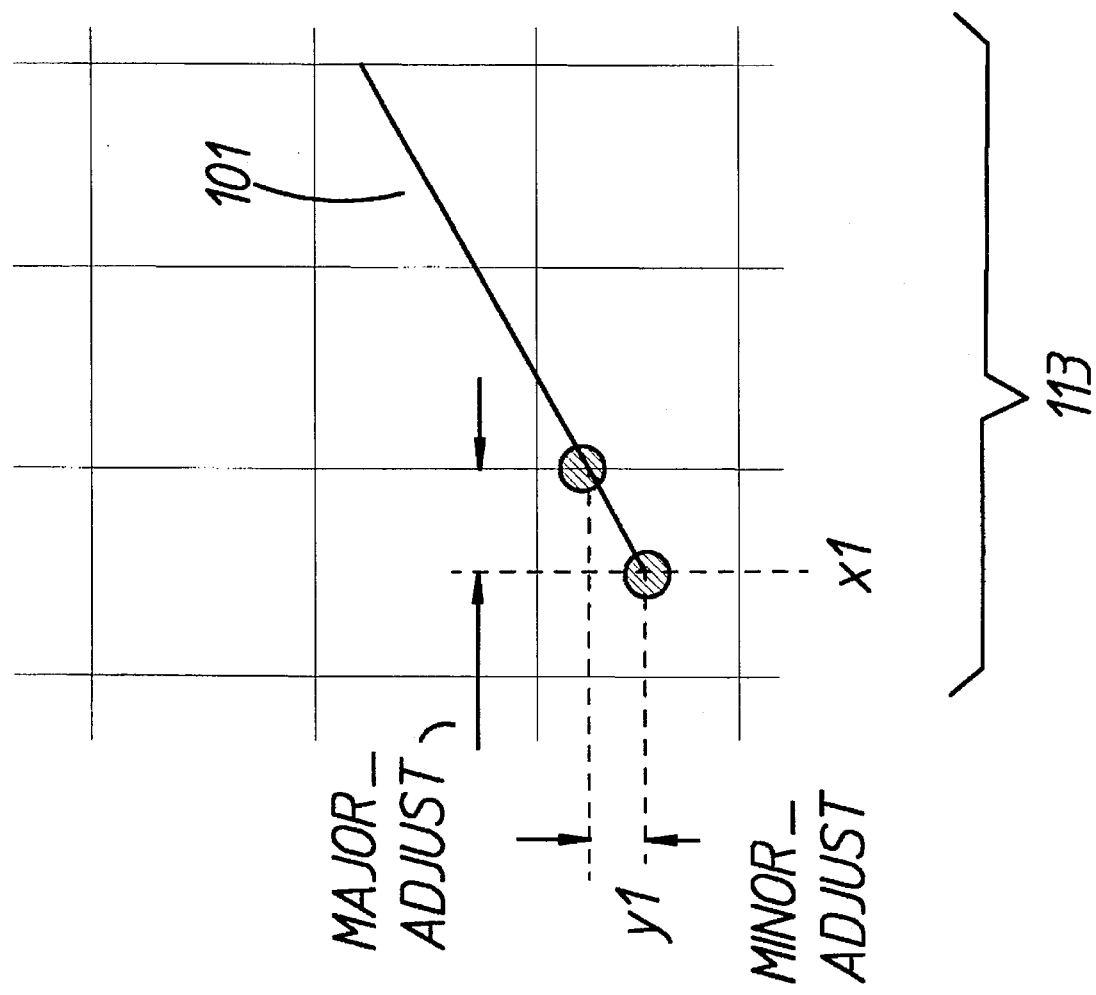
FIG. 6 is a diagram showing a portion of the line segment of FIGS. 4a and 4b on an expanded grid, illustrating some of the inputs of the stepper of the line scan converter of FIG. 3.

Operation of the line scan conversion preprocessor will now be discussed. FIG. 6 is an expanded view of portion 105 of FIGS. 4a and 4b. Referring just to FIGS. 4b and 6, since the distance from X1 to X2 is greater than the distance from Y1 to Y2, the line segment 1 is considered to be X major, i.e., X is the major axis. Additionally, since X increases from vertex V1 to vertex V2, the major axis is increasing.

Since the vertices V1 and V2 are not at integer values of X and Y, an adjustment may be performed to find the line segment's first crossing of an integer grid line in the major axis. As shown in more detail in FIG. 6, the X major line segment 101 first crosses a vertical grid line 113 at the X value shown by point A. It is important to note that at this point, the X value is an integer while the Y value contains a fractional part. At each major axis step, this fractional part along the minor axis may be used to choose which pixel to illuminate.

Referring to FIG. 3, preprocessor 130 receives the X and Y coordinates of the vertices of the line segment (step 152). The major axis is then determined by comparing the distance between X1 and X2 with the distance between Y1 and Y2 (step 154). If Y is found to be the major axis, M1 and M2 (variables representing the major axis coordinates of the two vertices) are set to Y1 and Y2, respectively, and N1 and N2 (variables representing the minor axis coordinates of the two vertices) are set to X1 and X2, respectively (step 156). Alternatively, if X is found to be the major axis, M1 and M2 are set to X1 and X2, respectively, and N1 and N2 are set to Y1 and Y2, (step 158). The next step is to determine whether the major axis is incrementing, by comparing M1 to M2 (step 160). If M2 is greater than M1, then the major axis is incrementing, and if M2 is not greater than M1, then the major axis is not incrementing.

Steps 162A and 162B determine whether a swap is required, for example when the vertices are swapped because the line segment is part of a polyline. The function of activating such a swap, which results in the line segment data being calculated in reverse order, (and therefore rendered in a different direction) is described in more detail below. Steps 160 and 162 A and B determine the calculations to be performed on the remaining inputs to the stepper 134. In steps 164A, 164B, 164C and 164D, the major start and major stop are determined. Note that both of these values will be integers, with respect to a display which identifies pixels with integer values. In steps 166A, 166B, 166C and 166D the slope is determined. In steps 168A, 168B, 168C and 168D, the major adjust is determined as a difference between one of the vertices and the major start. Steps 170A and 170B determine the minor adjust, and steps 172A and 172B determine the minor start. The major adjust and minor adjust values are interim results used to determine the minor start, and are not typically provided to the stepper 134.

Figure 7:
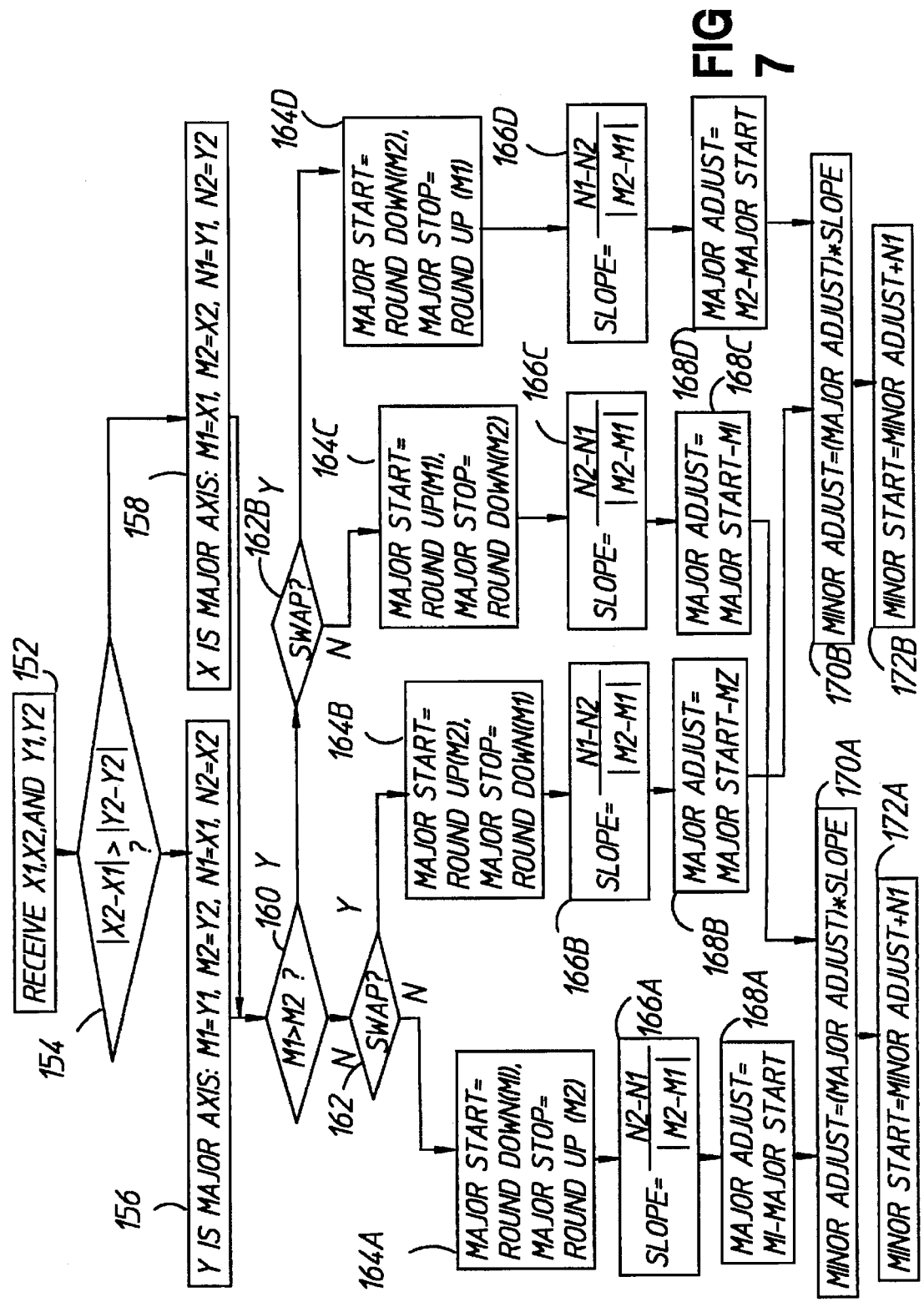
FIG. 7 is a flow chart that illustrates the operation of the preprocessor of FIG. 3.

FIG. 7 illustrates a process for a two dimensional line segment. However, additional parameters, such as a Z-coordinate or color values may also change along the line segment. For example, the line segment 101 in FIG. 4a and 4b may include color information or Z-coordinate information at vertices V1 and V2. In this instance, a slope for each of the other parameters may be determined such that the change in color or change in Z-coordinate is consistent with the chosen orientation of the line segment 1.

Figure 8:
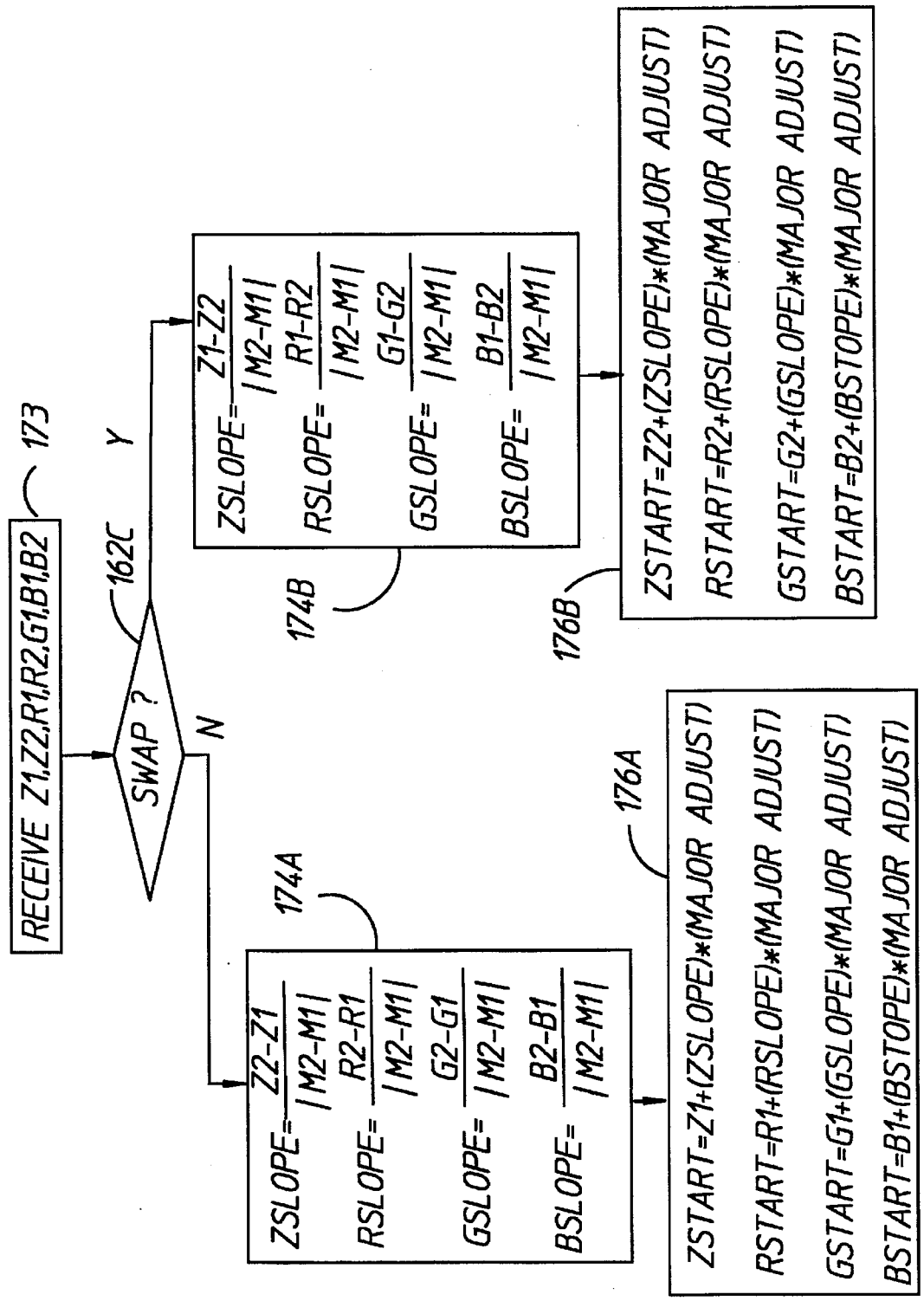
FIG. 8 is a flow chart illustrating the operation of an alternative display system according to the invention, which system is capable of operating on a third parameter such as a Z coordinate or color.

FIG. 8 illustrates a flow chart for determining the inputs related to additional parameters, such as a Z-coordinate, or red, green, and blue color values. The steps of FIG. 8 may be performed after the steps shown in FIG. 7, or as will be evident, some of the steps may be performed prior to or in parallel with some of the steps shown in FIG. 7. In step 173, the inputs for a third parameter are received. As shown in step 174, the inputs may include Z-coordinate inputs as well as red, green and blue color values. However, it may be desired to have only Z-coordinate inputs, or any combination of such parameters. Step 162C is identical to steps 162 A and B (FIG. 7), and determines whether a swap is required. If a swap is not required, the process continues to step 174A where the slope of each third parameter is determined. Similarly, step 174B determines the slopes in the instance in which a swap is required. Step 176A continues from step 174A and determines the start for each third parameter when a swap is not required. Step 176B continues from step 174B and determines the start for each third parameter when a swap is required.

Figure 9:
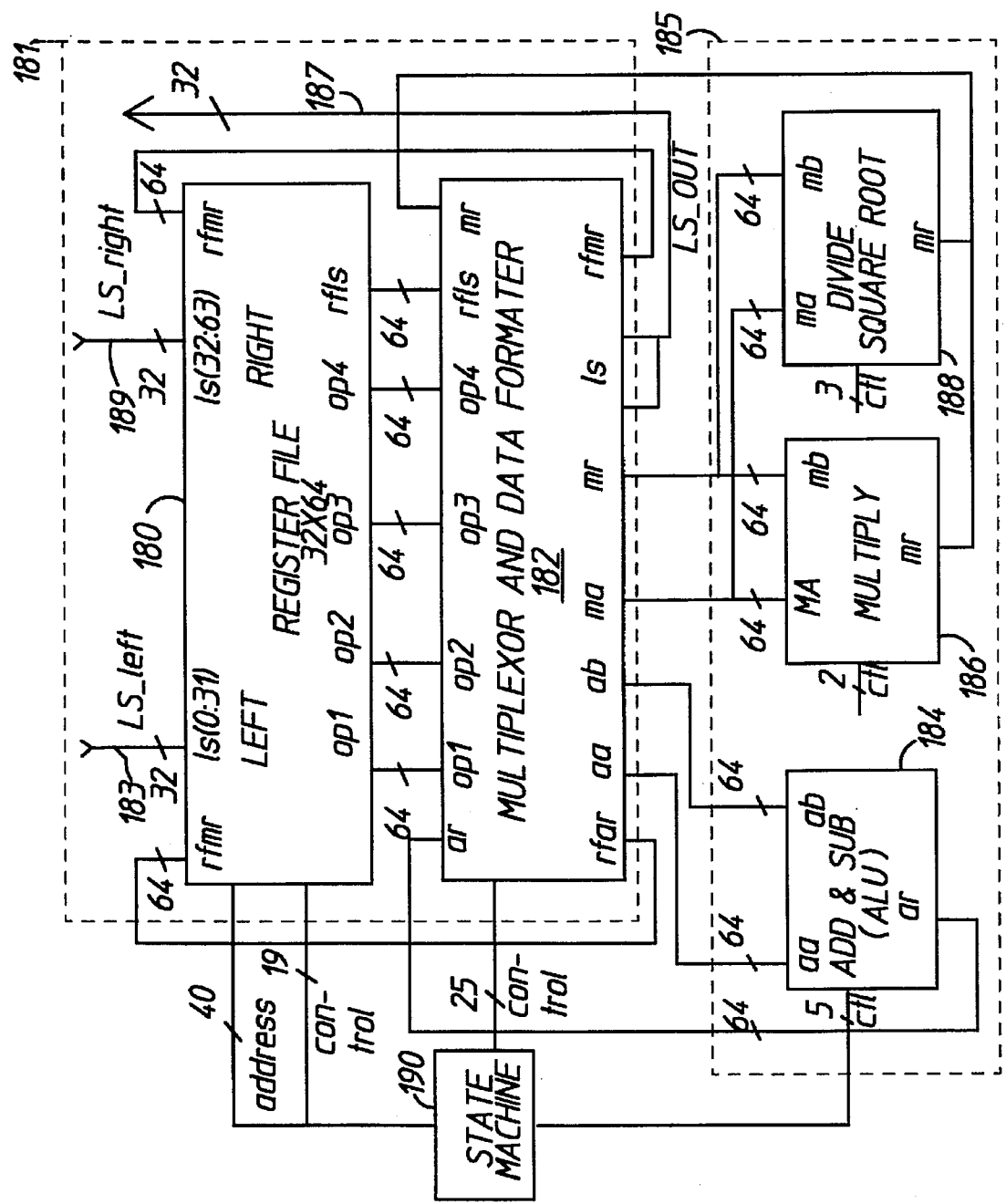
FIG. 9 is a system-level block diagram of the preprocessor of FIG. 3.

FIG. 9 is a more detailed block diagram of one embodiment of preprocessor 130, also depicted as elements within the right stack 79 of FIG. 2. In this embodiment, state machine 190 is a portion of the right stack control unit 83 of FIG. 2. The state machine 190 controls ALU 184, multiplier 186, and divider 188 to perform the functions which determine the inputs to stepper 134. Register file 180 and multiplexer/data formatter 182 provide storage and data routing. In this embodiment, inputs to the preprocessor 130 are generated in another part of the geometry accelerator. The inputs include may be received on LS_left bus 183, and LS_right bus 189. These buses may be connected to registers or RAM. The outputs of preprocessor 130 are provided on the LS_OUT bus 187, which preferably connects to a FIFO from which the stepper 134 may receive the information used for stepping.

In operation, register file 180 stores the floating point values of several parameters. In general, the parameters to be operated on are stored in register file 180 along with intermediate results and final results. Register file 180 and multiplexer/data formatter 182 may be generally referred to as data flow circuit 181. Multiplexer/data formatter 182 provides multiplexing functions. ALU 184 performs addition and subtraction. Multiplier 186 performs multiplications, and divider/square root calculator 188 performs divisions. A combination of ALU 184, multiplier 186, and divider/square root calculator 188 may be referred to as processing unit 185. State machine 190 controls the data flow among the other elements of FIG. 9, to perform the operations as shown in FIGS. 7 and 8. State machine 190 also controls the floating point cells to accommodate a swap of vertices as is described below with respect to FIG. 10.

As shown in FIG. 9, the preprocessing may be performed in hardware. However, as is evident to one skilled in the art from the foregoing figures, a general purpose computer may also be programmed to determine and provide the inputs to stepper 134. Such a computer would generally include a CPU, program memory such as a hard drive or EPROM, data memory such as random access memory, and a processing bus to interface among these elements. A communications device may also be used to interface to the stepper 134.

Figure 10:
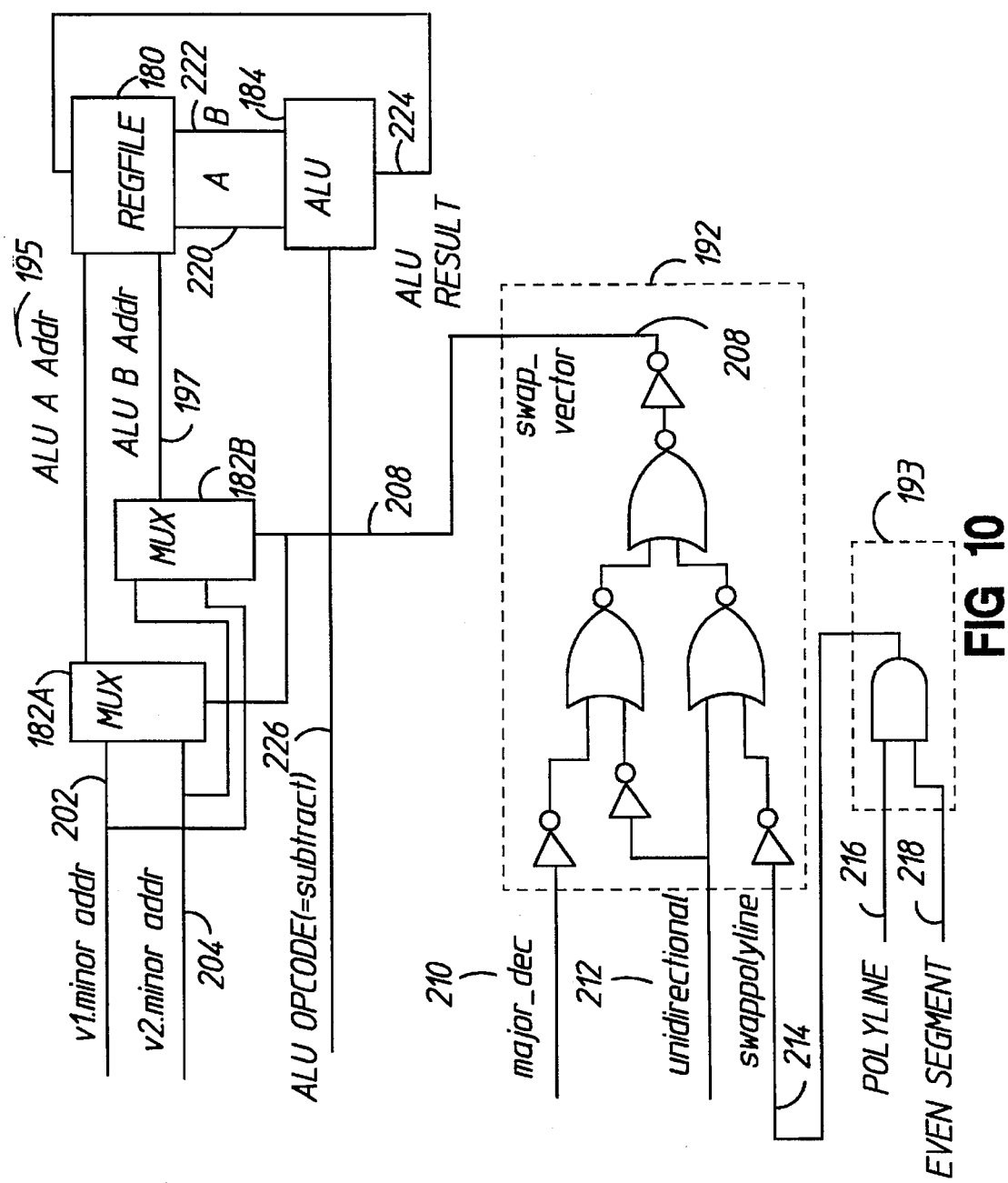
FIG. 10 is a block diagram illustrating a hardware embodiment of a portion of the preprocessor of FIG. 3.

FIG. 10 is a block diagram showing an embodiment of a logic circuit 192 that implements the swapping function, such as shown in steps 162 A–C in FIG. 7 and FIG. 8. This swap, which is preferably a virtual swap as described below, may be controlled by state machine 190. FIG. 10 also shows control and inputs used for the slope calculations (for example steps 166A, 166B, 166C, and 166D). The diagram is simplified in that it does not show circuitry which generates input signals, nor the flow of data from register file 180 to ALU 184 for example. However, one skilled in the art may easily generate the circuitry from the logical description which follows. V1 minor multiplexer 182A and V2 minor multiplexer 182B may be contained within multiplexer/data formatter 182, or may be separate elements. Register file 180 and ALU 184 are those shown in FIG. 9.

The hardware of FIG. 9 allows a virtual swap of vertex data to be performed when appropriate. The determination of whether the vertices are swapped depends upon whether the line segment is unidirectional, whether the major axis is incrementing, and whether the line segment is one of the line segments of a polyline to be rendered. A unidirectional line segment is one of the edges of a polygon. It is desirable to render each edge of a polygon in a consistent direction, so that two adjacent polygons (for example two adjacent triangles in a triangle strip) may share an identical edge. For this reason, each unidirectional line segment is preferably rendered in the direction of the major axis increasing.

If a line segment is part of a polyline, then it is desirable to virtually swap the vertices of every other line segment of the polygon. Therefore, for example, in a polyline having line segments 1–8, every even line segment will have its vertices virtually swapped (line segments 2, 4, 6, and 8), and the vertices of the odd line segments (1,3,5 and 7) will not be swapped. Because the swapping is achieved within the line scan converter 107 in this embodiment, the data for the shared vertices for the adjacent line segments of a polyline are not required to be provided twice.

For example, if a polyline includes a first line segment that has vertices V1 and V2 and a second line segment that has vertices V2 and V3, it is not be necessary to provide data for vertex V2 to the line scan converter 107 twice. Instead, the preprocessor 130 within the line scan converter 107 provides data for the vertices V1 and V2 to the stepper 134 for the first line segment, which the data preprocessor 130 uses to generate inputs to the stepper 134, after which the preprocessor virtually swaps the vertices internal to the preprocessor 130. The term "virtually" means that it is not necessary to actually move data among different locations, but only to redirect address references to the data, (for example the N1 signal on line 202 and the N2 signal on line 204 as explained in more detail below). Alternatively, the term "logically" could also be used. Then, the preprocessor may simply receive vertex V3 to replace the swapped vertex V1 in order to generate the inputs to the stepper 134 for the second line segment from V2 to V3. For a third line segment having vertices V3 and V4, a swap is not required. Vertex V2 is replaced by vertex V4, and the third line segment is rendered. In this manner, savings in processing time and resources may be achieved.

In operation, multiplexer 182A receives V1 minor address signal 202 (for example variable N1 of FIG. 5), and multiplexer 182B receives V2 minor address signal 204 (for example variable N1 of FIG. 7). Similar multiplexers may be provided to achieve a similar swap for the major axis vertex. The swapvectors signal 208 selects which variable, either ALU A address 195 or ALU B address 197, is provided to each of two locations in register file 180. For example, if swapvectors signal 208 is inactive, then the ALU will read N1 (the minor axis coordinate of vertex V1) on signal line 220 and will read N2 (the minor axis coordinate of vertex V2) on signal line 222. Accordingly, the ALU may subtract N1 from N2. However, if signal swapvectors 208 is active, the ALU 184 will read N2 on signal line 220 and will read N1 on signal line 222, and therefore will subtract N2 from N1. In the embodiment shown in FIG. 10, signals 195, 197, 202, and 204 are implemented as addresses which are indicative of the values for the variables. Alternatively, these signals may be provided as actual values, with a corresponding alternate swap circuit. The multiplexers 182A–B and the swapvector signal 108 simplify the functions shown in FIGS. 7 and 8, so that once a swap is made, the same calculations may be carried out with appropriate results, regardless of whether the vertices have been swapped. Signal 220 and signal 222 are input from register file 180 to ALU 184 for processing by ALU 184. The result, ALU result 224, is written into a location in register file 180, where it may be accessed for further processing. The ALU_OPCODE signal 206 indicates what operation the ALU should perform.

Logic circuit 192 is representative of a circuit for determining whether the swap vectors signal 208 is activated. Majordec signal 210 input to logic circuit 192 represents a result of step 160 in FIG. 7, where it was determined whether the major axis is incrementing. Accordingly, major dec signal 210, when active, indicates that the major axis is decreasing. Unidirectional signal 212, when active, indicates that the line segment should be rendered in a consistent direction, for example because the line segment is an edge of a polygon. This signal is representative of data received from host computer 15 of FIG. 1, and is shown as an input to line scan conversion preprocessor 130 in FIG. 3. The consistent direction chosen for this embodiment is such that the line segment is rendered in a major axis increasing direction.

The swappolyline signal 214, also shown in FIG. 3, when active, indicates that the line segment is, for example, one of the even line segments of a polyline, and therefore its vertices should be reversed (swapped).

Swappolyline logic circuit 193 is representative of the logic associated with generating the swappolyline signal 214, and may be internal or external to line scan conversion preprocessor 130. Two signals are used to generate the swappolyline signal, a polyline signal 216 and an evensegment signal 218. The polyline signal 216 is an indication that the line segment is part of a polyline, while the evensegment signal 218 is an indication that the line segment is one of the even segments of the polyline. These indications may be initially received from host computer 15. If the line segment is part of a polyline and is an even segment of the polyline, then the preprocessor 130 swaps the vertices of this line segment, so that only one set of new vertex data is required by line scan conversion preprocessor 130, because the second vertex of the previous line segment is the first vertex of the current line segment. Therefore, the swappolyline signal 214 is a logical AND combination of the evensegment signal 218 and the polyline signal 216. Then, an appropriate swap may be activated by logic circuit 192. The ALU_OPCODE signal 206 indicates what operation the ALU should perform. The truth table below shows the requirements for the swapvectors signal 208:

|     | Major_dec | unidirectional | swappolyline | swap_vectors |
| --- | --- | --- | --- | --- |
| (a) | 0 | 0 | 0 | 0 |
| (b) | 0 | 0 | 1 | 1 |
| (c) | 0 | 1 | 0 | 0 |
| (d) | 0 | 1 | 1 | _* |
| (e) | 1 | 0 | 0 | 0 |
| (f) | 1 | 0 | 1 | 1 |
| (g) | 1 | 1 | 0 | 1 |
| (h) | 1 | 1 | 1 | _* |

In case (a) of the truth table, the line segment has a major axis that is increasing (majordec=0), and the line segment is neither an edge of a polygon (unidirectional=0), nor is it an even segment of a polyline (swappolyline=0). Therefore, it is either a single line segment having an implied orientation, or it is an odd segment of a polyline and the vertices of this line segment will not be swapped. As a result, the line segment will be rendered in a direction consistent with the implied orientation.

Case (e) is the same as case (a), but represents a line segment that has a decreasing major axis. In order that this line segment is also rendered with the implied orientation, the vertices are also not swapped.

In cases (b) and (f), the line segment is an even segment of a polyline, and therefore in both of these cases the vertices are swapped, regardless of whether the major axis is increasing or decreasing.

In case (c), the line segment is a polygon edge having an increasing major axis. In such a case, the vertices are not swapped. However, case (g) represents a polygon edge having a decreasing major axis, in which case the vertices are swapped so that all polygon edges are rendered in a direction in which the major axis is increasing. As described earlier, this allows the shared edge of two adjacent polygons to be rendered identically for both adjacent polygons.

Cases (d) and (h), highlighted with an asterisk(*), denote cases which do not occur, because a line segment will not be both unidirectional (art edge of a polygon) and have a swappolyline condition, because the swappolyline condition is indicative of the line segment being part of a polyline. Therefore, the swap-vectors signal in these cases does not matter.

As with the hardware depicted in FIG. 9, the function of the hardware in FIG. 10 may also be performed in software within a general purpose computer.

As a result of the embodiments described in this disclosure, line segments may be rendered in a predetermined direction. In particular, individual line segments and line segments that are part of a polyline are rendered in a direction consistent with the implied direction of each of these line segments. In this manner, the correct graphics associated with these line segments (such as dashing) are generated.

Furthermore, the processing resources of a graphics system may be reduced because data for both, vertices of every other line segment of a polyline do not need to be provided to the line scan converter. Instead, the vertices of a previous line are virtually swapped, and therefore only data for the second vertex is then required.

Moreover, shared edges of two adjacent polygons will be represented by the same pixels, because the shared edges will be rendered in the same direction (major axis increasing) even when rendered twice, once for each of the two adjacent polygons.

Having thus described several particular embodiments of the invention, various alterations, modifications, and improvements will readily occur to those skilled in the art. Such alterations, modifications, and improvements are intended to be within the spirit and scope of the invention. For example, unidirectional line segments could be rendered with the major axis decreasing instead of increasing. Accordingly, the foregoing description is by way of example only, and not intended to be limiting. The invention is limited only as defined in the following claims and the equivalents thereto.

What is claimed is:

1. In a computer graphics system, apparatus for line scan conversion of vertex data for first and second vertices of a line segment to pixel data, comprising:

a line scan preprocessor responsive to said vertex data for generating rendering parameters in a predetermined rendering direction, said line scan preprocessor including:

a first circuit responsive to an input indicative of a line segment type for determining whether said vertex data for said first and second vertices corresponds to said predetermined rendering direction; and a second circuit responsive to a determination that said vertex data does not correspond to said predetermined rendering direction for swapping an order of calculation of said rendering parameters to achieve said predetermined rendering direction; and a line scan stepper for converting said rendering parameters to pixel data for generating a display of said line segment.

2. The apparatus of claim 1, wherein said first circuit includes means for providing said determination that said vertex data does not correspond to said predetermined rendering direction when said line segment type indicates that said line segment is an even segment of a polyline.

3. The apparatus of claim 1, wherein said line scan preprocessor further includes a third circuit for determining whether said line segment has a major step direction of a predetermined sign, and wherein said first circuit includes means for providing said determination that said vertex data does not correspond to said predetermined rendering direction when said line segment type indicates that said line segment is an edge of a polygon and said third circuit determines that said line segment has said major step direction of said predetermined sign.

4. The apparatus of claim 1, wherein said line scan preprocessor further includes a memory for storing the vertex data for said first and second vertices at first and second locations, respectively, and a control circuit for providing first and second addresses of said first and second locations to access the vertex data for generating said rendering parameters, and wherein said first circuit includes a multiplexer for swapping said first and second addresses in response to the determination that said vertex data does not correspond to said predetermined rendering direction.

5. The apparatus of claim 1, wherein the line scan stepper is constructed and arranged so that the pixel data to which said rendering parameters are converted is dependent upon a rendering direction in which the line scan stepper converts said rendering parameters.

6. In a computer graphics system having a line scan stepper for converting rendering parameters to pixel data for a display, a method for preprocessing vertex data for a first vertex and a second vertex of a line segment to generate said rendering parameters, the method comprising the steps of:

determining whether said vertex data for said first and second vertices corresponds to a predetermined rendering direction in response to an indication of line segment type;

swapping an order of calculation of said rendering parameters to achieve said predetermined rendering direction when said vertex data does not correspond to said predetermined rendering direction; and calculating said rendering parameters for said line segment in said predetermined rendering direction.

7. The method of claim 6, further comprising the step of determining whether said line segment has a major step direction of a predetermined sign, and wherein the step of determining whether said vertex data corresponds includes determining that said line segment type indicates that said line segment is an edge of a polygon and that said line segment has the major step direction of the predetermined sign.

8. The method of claim 6, wherein the display has a vertical axis and a horizontal axis, and wherein the step of calculating said rendering parameters includes the steps of:

determining a major axis by determining that the line segment has a greater magnitude in one of the vertical axis and the horizontal axis of the display, a minor axis being the other of the vertical axis and the horizontal axis of the display;

determining a major step direction by determining whether a major axis value of the second vertex is greater than a major axis value of the first vertex;

determining a major start as a major axis coordinate value of a first pixel to be rendered by the line scan stepper;

determining a major stop as a major axis coordinate value of a last pixel to be rendered by the line scan stepper;

determining a slope as a ratio of a first difference between the major axis value of the first vertex and the major axis value of the second vertex, to a second difference between a minor axis value of the first vertex and a minor axis value of the second vertex; and determining a minor start as a minor axis coordinate value of a first pixel to be rendered by the line scan stepper.

9. The method of claim 6, further including the steps of:

storing the vertex data for said first and second vertices in a memory at first and second locations respectively;

providing first and second addresses of said first and second locations to access the vertex data for generating said rendering parameters; and providing a multiplexer for swapping said first and second addresses in response to the determination that said vertex data does not correspond to said predetermined rendering direction.

10. The method of claim 6, further including the steps of:

receiving vertex data for a third vertex representative of a second line segment, the first line segment and the second line segment being adjacent segments of a polyline; and generating the rendering parameters for the line scan stepper based upon the data for the second vertex and the data for the third vertex, so that the line scan stepper renders the second line segment in a direction from the second vertex to the third vertex.

11. The method of claim 10, wherein the step of generating rendering parameters includes the steps of:

swapping data for the first vertex with data for the second vertex; and replacing the data for the first vertex with data for the third vertex, so that the rendering parameters are generated based upon the data for the second vertex and the third vertex.

12. The method of claim 6, wherein the step of calculating includes determining the pixel data, the pixel data being dependent upon the predetermined rendering direction in which the pixel data is determined.

13. In a computer graphics system having a line scan stepper for converting rendering parameters to pixel data for a display, an apparatus for preprocessing vertex data for a first vertex and a second vertex of a line segment to generate said rendering parameters, the apparatus comprising:

means for determining whether said vertex data for said first and second vertices corresponds to a predetermined rendering direction in response to an indication of line segment type;

means for swapping an order of calculation of said rendering parameters to achieve said predetermined rendering direction when said vertex data does not correspond to said predetermined rendering direction; and means for calculating said rendering parameters for said line segment in said predetermined rendering direction.

14. The apparatus of claim 13, further comprising means for determining whether said line segment has a major step direction of a predetermined sign, and wherein the means for determining whether said vertex data corresponds includes means for determining that said line segment type indicates that said line segment is an edge of a polygon and that said line segment has the major step direction of the predetermined sign.

15. The apparatus of claim 13, wherein the display has a vertical axis and a horizontal axis, and wherein the means for calculating said rendering parameters includes:

means for determining a major axis by determining that the line segment has a greater magnitude in one of the vertical axis and the horizontal axis of the display, a minor axis being the other of the vertical axis and the horizontal axis of the display;

means for determining a major step direction by determining whether a major axis value of the second vertex is greater than a major axis value of the first vertex;

means for determining a major start as a major axis coordinate value of a first pixel to be rendered by the line scan stepper;

means for determining a major stop as a major axis coordinate value of a last pixel to be rendered by the line scan stepper;

means for determining a slope as a ratio of a first difference between the major axis value of the first vertex and the major axis value of the second vertex, to a second difference between a minor axis value of the first vertex and a minor axis value of the second vertex; and means for determining a minor start as a minor axis coordinate value of a first pixel to be rendered by the line scan stepper.

16. The apparatus of claim 13, further including:

means for storing the vertex data for said first and second vertices in a memory at first and second locations respectively;

means for providing first and second addresses of said first and second locations to access the vertex data for generating said rendering parameters; and a multiplexer for swapping said first and second addresses in response to the determination that said vertex data does not correspond to said predetermined rendering direction.

17. The apparatus of claim 13, further including:

means for receiving vertex data for a third vertex representative of a second line segment, the first line segment and the second line segment being adjacent segments of a polyline; and means for generating the rendering parameters for the line scan stepper based upon the data for the second vertex and the data for the third vertex, so that the line scan stepper renders the second line segment in a direction from the second vertex to the third vertex.

18. The apparatus of claim 17, wherein the means for generating rendering parameters includes:

means for swapping data for the first vertex with data for the second vertex; and means for replacing the data for the first vertex with data for the third vertex, so that the rendering parameters are generated based upon the data for the second vertex and the third vertex.

19. The apparatus of claim 13, wherein the means for calculating includes means for determining the pixel data, the pixel data being dependent upon the predetermined rendering direction in which the pixel data is determined.

* * * * *